United States Patent
Vu

(10) Patent No.: US 11,136,750 B2
(45) Date of Patent: Oct. 5, 2021

(54) HANDLE ALIGNMENT ADAPTER FOR FIXED POSITION VALVE BODY PLUMBING FIXTURE APPLICATIONS

(71) Applicant: Brasstech, Inc., Santa Ana, CA (US)

(72) Inventor: Vinh Trong Vu, Irvine, CA (US)

(73) Assignee: Brasstech, Inc., Santa Ana, CA (US)

( * ) Notice: Subject to any disclaimer, the term of this patent is extended or adjusted under 35 U.S.C. 154(b) by 0 days.

(21) Appl. No.: 15/245,313

(22) Filed: Aug. 24, 2016

(65) Prior Publication Data

US 2017/0067236 A1   Mar. 9, 2017

Related U.S. Application Data

(60) Provisional application No. 62/215,989, filed on Sep. 9, 2015.

(51) Int. Cl.
| | | |
|---|---|---|
| *F16K 31/60* | (2006.01) | |
| *E03C 1/04* | (2006.01) | |
| *G05G 1/12* | (2006.01) | |

(52) U.S. Cl.
CPC ............ *E03C 1/0412* (2013.01); *F16K 31/60* (2013.01); *G05G 1/12* (2013.01); *Y10T 137/6024* (2015.04)

(58) Field of Classification Search
CPC ........... E03C 1/0412; E03C 2001/0414; F16K 31/60; F16K 31/53; F16K 31/535; F16K 31/605; F16K 31/607; F16K 31/602; F16K 31/58; F16K 11/0743; F16K 11/0746; F16K 1/523; F16K 3/08; Y10T 137/7668; Y10T 137/86815; Y10T 137/86823; Y10T 137/86549; Y10T 137/6024; Y10T 137/6011–6062; Y10T 74/20762; Y10T 74/2084; Y10T 403/40; Y10T 403/7033; G05G 1/08; G05G 1/082; G05G 1/085; G05G 1/087; G05G 1/10; G05G 1/12; Y10S 16/30; F16B 2200/403

(Continued)

(56) References Cited

U.S. PATENT DOCUMENTS

| | | | |
|---|---|---|---|
| 2,829,538 A | | 4/1958 | Mueller |
| 2,838,270 A | * | 6/1958 | Danielson ............... G05G 1/10  251/110 |
| 3,301,580 A | * | 1/1967 | Greitzer ................. F16K 31/60  16/422 |

(Continued)

OTHER PUBLICATIONS

Slater tool brochure, taken from the interneton Nov. 19, 2020; [http://www.slatertools.com/resources/uploads/PDFs/ST-catalog-english.pdf] (Year: 2020).*

*Primary Examiner* — Craig J Price

(74) *Attorney, Agent, or Firm* — Carlson, Gaskey & Olds, P.C.

(57) ABSTRACT

A handle assembly for an in-wall plumbing fixture includes a control valve having a rough plumbing attachment interface that is configured to connect to a rough valve. The control valve includes a control stem having a first number of teeth. The assembly includes a lever handle, with a second number of teeth that is different than the first number of teeth, and which is configured for attachment to the control valve. An adapter couples the control stem to the lever handle. The adapter has a set of adapter internal teeth corresponding in number to the first number of teeth and a set of adapter external teeth corresponding in number to the second number of teeth. The adapter can be included in an adjustment kit to align the handle lever.

34 Claims, 13 Drawing Sheets

(58) Field of Classification Search
USPC ............... 137/454.6, 625.4, 625.41, 625.17, 137/315.11–315.26; 74/543, 548; 4/675, 4/678
See application file for complete search history.

(56) References Cited

U.S. PATENT DOCUMENTS

| | | | | |
|---|---|---|---|---|
| 3,396,604 | A * | 8/1968 | Samuels | F16K 31/60 16/441 |
| 3,789,870 | A * | 2/1974 | Keller, III | F16K 11/20 137/454.5 |
| 4,306,468 | A * | 12/1981 | Bolgert | G05G 1/12 16/422 |
| 4,593,430 | A | 6/1986 | Spangler et al. | |
| 4,616,673 | A | 10/1986 | Bondar | |
| 4,678,002 | A | 7/1987 | Valley | |
| 4,794,945 | A | 1/1989 | Reback | |
| 4,842,009 | A | 6/1989 | Reback | |
| 4,961,443 | A | 10/1990 | Buccicone et al. | |
| 5,671,904 | A | 9/1997 | Minutillo | |
| 5,826,788 | A * | 10/1998 | Redding | F16C 17/02 251/355 |
| 6,195,840 | B1 * | 3/2001 | Pilatowicz | F16K 31/607 16/441 |
| 6,438,771 | B1 * | 8/2002 | Donath, Jr. | F16K 31/60 137/359 |
| 6,880,805 | B2 | 4/2005 | Ortega, Jr. et al. | |
| 6,886,578 | B1 | 5/2005 | Knapp | |
| 7,264,016 | B2 * | 9/2007 | Molina | E03C 1/04 137/454.6 |
| 7,331,358 | B2 | 2/2008 | Gallina et al. | |
| 7,896,025 | B2 * | 3/2011 | Hanson | E03C 1/04 137/454.6 |
| 8,079,381 | B2 * | 12/2011 | Fischer | F16K 31/607 137/315.15 |
| 8,375,974 | B2 | 2/2013 | Yan | |
| 8,607,662 | B2 | 12/2013 | Huang | |
| 8,726,926 | B2 | 5/2014 | Klein | |
| 2002/0124309 | A1 * | 9/2002 | Donath, Jr. | F16K 31/60 4/678 |
| 2003/0101510 | A1 * | 6/2003 | Ottelli | E03C 1/023 4/675 |
| 2010/0213399 | A1 * | 8/2010 | Yan | F16K 31/60 251/235 |
| 2011/0220827 | A1 * | 9/2011 | Tortorello | F16K 31/602 251/231 |

* cited by examiner

HANDLE ALIGNMENT ADAPTER FOR FIXED POSITION VALVE BODY PLUMBING FIXTURE APPLICATIONS

RELATED APPLICATION

This application claims priority to U.S. Provisional Application No. 62/215,989, filed Sep. 9, 2015.

BACKGROUND OF THE INVENTION

The present invention generally relates to a rotational adjustment adapter kit for handle alignment of plumbing fixtures.

Rotating handles of most water delivery plumbing fixtures have a more favorable aesthetic appearance when the handles can be oriented vertically, horizontally or in a generally consistent angle that aligns with other product features or even with the angle of a related product handle that may be installed nearby. Such handle alignment is most critical when the handle is in the off position because this position is the most often viewed position.

The handles of such plumbing fixtures are affixed to cartridges of the plumbing fixture. Cartridges used in plumbing fixtures typically include a rotating stem, which has a fixed number of transverse teeth, integral to a non-rotating housing. This type of cartridge typically has a fixed rotational position shut-off wherein the stem of the cartridge, when rotated to the off position, is always at the same fixed rotational position (or angle) with respect to the non-rotating housing of the cartridge. It is through the housing that water is permitted to pass as controlled by the rotating stem.

It is via the handle that the rotation of the stem is controlled during use; and is typically rotated 90° between the full-on and off positions. Handles are typically affixed to the stems of their respective cartridges by a spline/broach interface. The spline of a cartridge stem has a fixed number of teeth (i.e. 16 or 20, for example) and matches exactly with the teeth of a broach internal to a pivot point of the handle. The handle slides onto the spline of the stem during product assembly or installation.

Given these relationships (handle—cartridge, stem—cartridge housing), adjustments to the angular alignment of the handle in the off position with respect to the cartridge housing are limited by the increments predetermined by the number of teeth. For example, if there are 16 teeth, this would allow for 360°÷16 teeth=22.5° increments inherent to the spline/broach interface between the cartridge stem and the handle.

One group of products retains handle angle adjustability as limited by the number of teeth characterized by the spline/broach interface. As such, handles of plumbing fixtures in this group can be misaligned with respect to the preferred angle by as much as 11.25° (22.5°÷2=11.25°). Examples of fixtures in this group include: widespread lavatory faucets, roman tub faucets, wall-mounted lavatory faucets, wall-mounted tub handle sets, shower control valves, bridge faucets, and bridge style tub faucets.

The type of cartridge described above is typically integrated into a valve body using a threaded interface. The valve body is either affixed to a mounting surface during fixture installation, typically a wall or countertop, or is incorporated into the plumbing fixture design itself and is not a separate component. The interface between the valve body and the cartridge housing establishes two separate chambers (inlet chamber and outlet chamber) between which the cartridge housing controls the flow. This interface is established by tightening the external thread of the cartridge housing into the internal thread of the valve body to a predetermined torque.

Once integrated to the valve body, the fixed position of the cartridge housing and the corresponding position (or angle) of the cartridge stem at shut-off, cannot be meaningfully altered by increasing the torque between the cartridge and the valve body. Additionally, doing so can compromise the structural integrity of the assembly. Given this constraint, the only way to alter the angle of the cartridge stem at shut-off to affect preferred alignment of the handle is via a rotational repositioning of the valve body with respect to its mounting surface. Rotational repositioning of the valve body at time of installation is possible for some products, but not many. Such products include, for example, widespread lavatory faucets and some roman tub faucets (those that are plumbed with flexible hoses as opposed to hard plumbed using copper tubing).

Some plumbing products have valve bodies that can be rotated with respect to the fixed installation surface. An example of this would be a widespread faucet comprised of one hot water control handle assembly, one cold water control handle assembly, and one spout assembly. For this type of product, each valve assembly (cartridge with valve body) for each control handle assembly is installed through its own hole in the countertop. As such, during installation, as the broach at the pivot point of the handle is placed onto the spline of the cartridge, the alignment angle of the handle is established (spline/broach interface adjustment). At that point it is either aligned or it is not. If not aligned, it can be adjusted in two ways. A first adjustment would include disengaging the handle and then re-engaging the handle broach at a more favorable angle as afforded and limited by the number of spline/broach teeth. More often than not, the precision afforded by this type of adjustment is not enough to eliminate misalignment. Accordingly, if additional adjustment options are permitted by the fixture design, the installer is eager to use them. For fixtures outlined in the second group of products, the installer is free to adjust the handle angle by a rotational repositioning of the valve body to finalize handle alignment.

All plumbing fixtures of the first group of products that are not additionally a part of second group of products, only retain handle alignment adjustability as afforded by the spline/broach interface adjustment. As such, the handles of these fixtures routinely lack the favorable aesthetic of properly aligned handles. Given that their designs do not afford them an opportunity to be more precisely aligned, there is a desire to reduce the angular variance of handles of these fixtures in a simple and effective manner.

SUMMARY OF THE INVENTION

According to one exemplary embodiment, a handle assembly for a plumbing fixture includes a control valve having a rough plumbing attachment interface and a control stem having a first number of teeth. A lever handle, with a second number of teeth that is different than the first number of teeth, is configured for attachment to the control valve, and an adapter couples the control stem to the lever handle. The adapter has a set of adapter internal teeth corresponding in number to the first number of teeth and a set of adapter external teeth corresponding in number to the second number of teeth.

In another embodiment according to any other disclosed embodiment, the first number of teeth is different than the second number of teeth. In another example, the first number of teeth is greater than the second number of teeth.

In another embodiment according to any other disclosed embodiment, the first number of teeth are formed on an external surface of the control stem and the second number of teeth are formed on an internal surface of the lever handle.

In another embodiment according to any other disclosed embodiment, the adapter internal teeth are formed on an internal surface of the adapter and the adapter external teeth are formed on an external surface of the adapter.

In another embodiment, an adjustment kit for a plumbing fixture includes an adapter as described above.

These and other features of the present invention can be best understood from the following specification and drawings, the following of which is a brief description.

DETAILED DESCRIPTION

Figure 1:
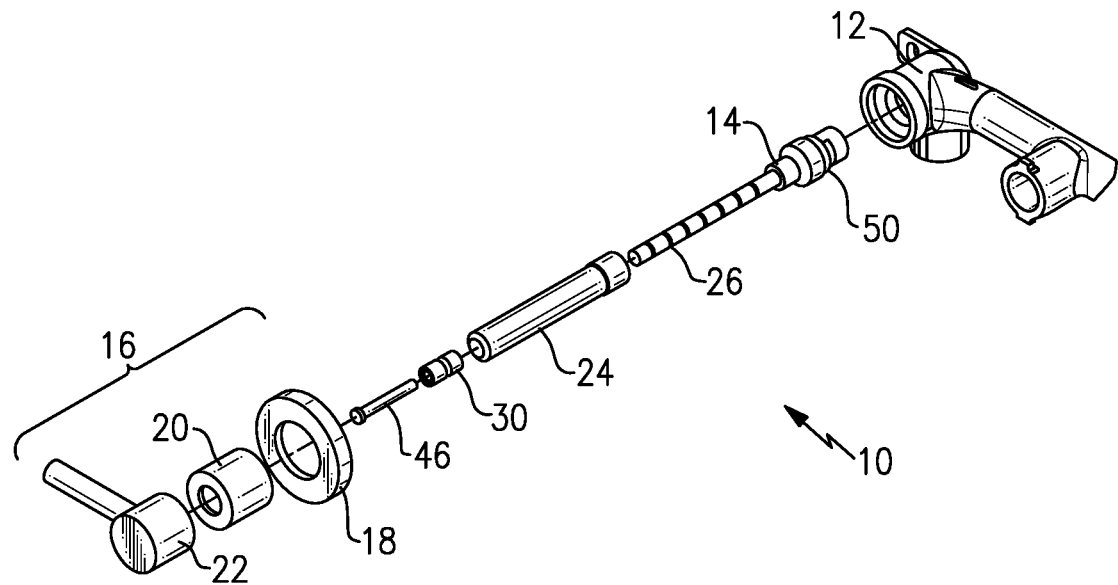
FIG. 1 is an exploded view of an in-wall lever assembly that incorporates the subject invention.

FIG. 1 shows an in-wall lever assembly 10 that includes a rough valve 12, a control valve 14, an all thread nipple 24, and a handle assembly 16. The handle assembly 16 includes a ring 18, a base 20, and a lever handle 22. In one known example, the control valve 14 has a control stem 26 that has sixteen external broached teeth and the lever handle 22 has sixteen internal broached teeth. When this known valve is assembled, the handle position for the lever handle 22 could be as great as 11.25° misaligned from the desired horizontal or vertical alignment.

A maximum angle of misalignment in a cartridge spline of the control stem 26 to an internal handle broach of the lever handle 22 is defined as: Maximum Angle of Misalignment= (360 degrees/"Cartridge Spline")÷2. The term "cartridge spline" is defined as a number of teeth over 360 degrees of the cartridge spline of the control stem 26. It is also equal to the number of teeth on a broach of the lever handle 22 (interior to handle rotational axis) for configurations not using an adapter 30 as described below. In a 16 tooth example (360°/16=) 22.5°, the handle could be misaligned with respect to the preferred angle by as much as 11.25° (22.5°÷2=11.25°).

Figure 2A:
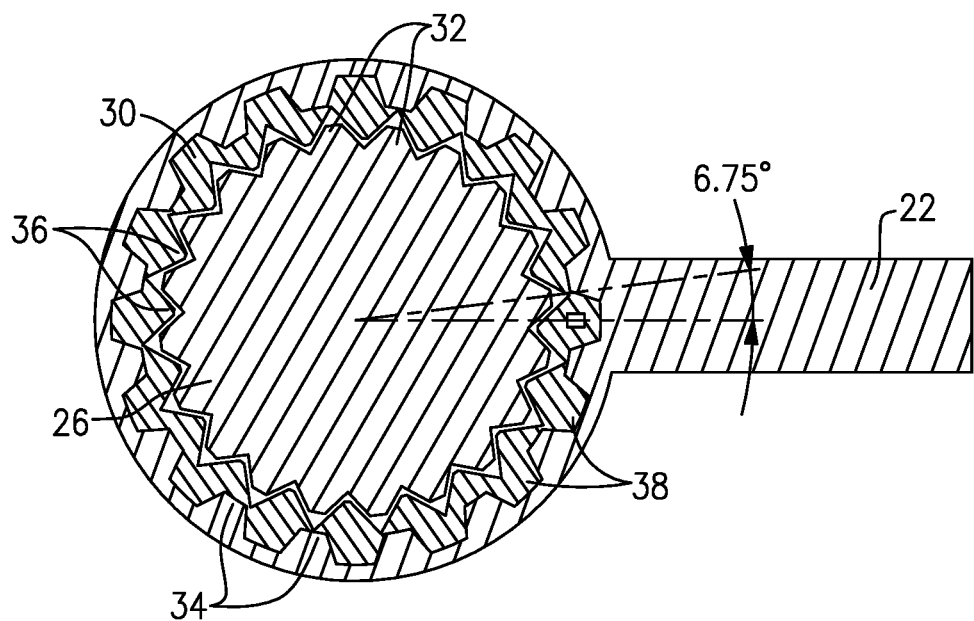
FIG. 2A is a cross-section of a control stem, adapter, and lever handle stem when assembled.

To avoid such a large variance, the handle assembly 16 of the subject invention includes an adapter 30 that couples the lever handle 22 to the control stem 26 without any intervening components as shown in FIG. 2A. Further, instead of having the same number of teeth, the subject invention provides a control stem 26 and a lever handle 22 that have a different number of broached teeth. In one example, the control stem 26 has a greater number of teeth than the lever handle 22.

Figure 2B:
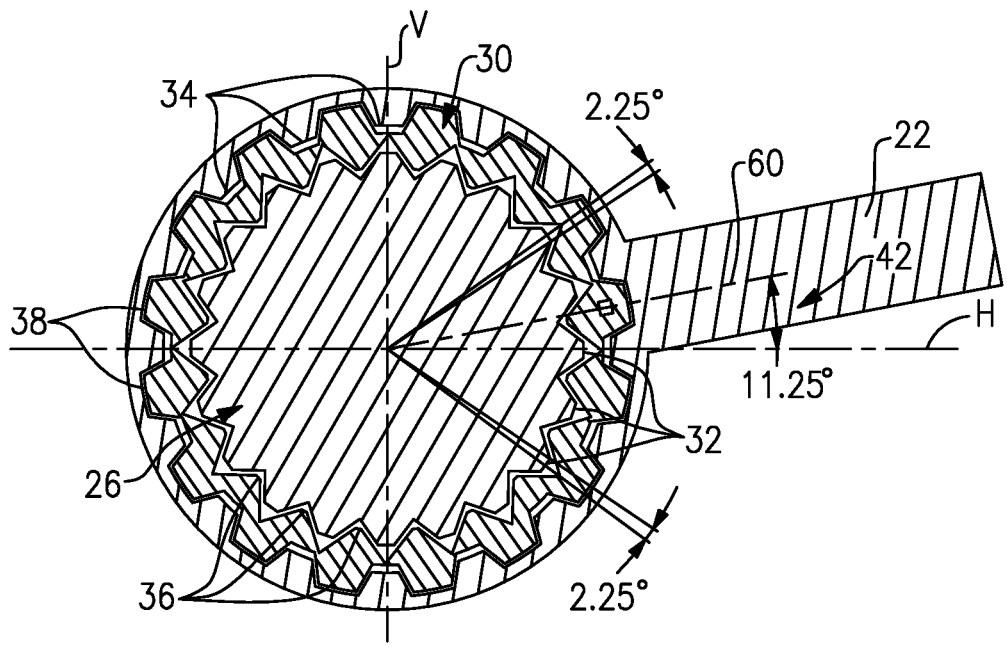
FIG. 2B is a view similar to 2A but with the cross-hatching removed for purposes of clarity, and shows a maximum possible misalignment.

For example, as shown in FIGS. 2A-B, the control stem 26 has twenty external teeth 32 and the lever handle 22 has sixteen internal teeth 34. The adapter 30 is configured to accommodate the two different numbers of teeth. For example, the adapter 30 has twenty internal teeth 36 and sixteen external teeth 38. The differing numbers of teeth allow for the angle of the lever handle 22 to be adjusted in small increments when the adapter 30 is rotated. In one embodiment, this adapter may be provided as an adjustment kit to the consumer to adjust an already installed lever handle.

The definition of "external teeth" is number of teeth over 360 degrees of the outside of the adapter 30. It is equal to the number of teeth on the interior broach of the lever handle 22 (interior to handle rotational axis) for configurations using the adapter 30. The definition of "internal teeth" is number of teeth on the inside of the adapter 30. It is equal to the number of teeth on the cartridge spline of the control stem 26 for configurations using the adapter 30.

The adapter 30 is comprised of disparate quantities of internal and external teeth such that whichever (internal or external) has more teeth divided by whichever has fewer teeth does not equal a whole number (integer). So long as this condition is met, the adapter 30 reduces the "maximum angle of misalignment" as compared to not using the adapter. With the adapter 30, a cartridge spline of the control stem 26 connected to handle broach of the lever handle 22 with the adapter 30 having internal and external teeth possesses a maximum angle of misalignment defined by: Maximum Angle of Misalignment=2×[(360 degrees÷"Adapter External Teeth")÷"Adapter Internal Teeth"]. Examples of the maximum angle of misalignment with the adapter 30 will be discussed in greater detail below.

To change the angular alignment of the lever handle 22, an installer rotates the adapter 30 relative to the control stem 26. The maximum misalignment with this assembly is as low as 2.25° as indicated at 40 (FIG. 4) by using the adapter 30 for adjustment. The misaligned could be as great as 11.25° as indicated at 42 (FIG. 2B); however, by using the adapter 30, this misalignment can be reduced to only 2.25° as will be explained in further detail below.

The control valve 14 has a rough plumbing attachment interface 50 that connects to the rough valve 12. As known, the control valve 14 and rough valve 12 cooperate with each other to control fluid flow in a fixture where water could be directed to flow into a sink, tub, shower, etc. As discussed above, the control stem 26 has a first number of teeth 32 and the lever handle 22 has a second number of teeth 34 that is different than the first number of teeth 32 with the qualifier that when dividing the larger number of teeth by the smaller number of teeth the result is not a whole number (integer). The adapter 30 that couples the control stem 26 to the lever handle 22 has a first adapter set of teeth 36 that corresponds in number to the first number of teeth 32 and a second adapter set of teeth 38 that corresponds in number to the second number of teeth 34. A fastener 46 can be used to secure the adapter 30 to the control stem 26, such that there is no movement between the control stem-to-adapter interface during use and that rotation of the lever handle 22 results in rotation of the adapter 30 relative to the control stem 26 with no additional wobbling or unwanted movement.

The first number of teeth 32 are formed on an external surface of the control stem 26 and the second number of teeth 34 are formed on an internal surface of the lever handle 22. The first adapter set of teeth 36 are formed on an internal surface of the adapter 30 and the second adapter set of teeth 38 are formed on an external surface of the adapter 30. In one example, there are twenty teeth for the first number of teeth 32 and the first adapter set of teeth 36, and there are sixteen teeth for the second number of teeth 34 and the second adapter set of teeth 38.

The adapter 30 is rotated relative to the control stem 26 to adjust a position of the lever handle 22 relative to a horizontal position or vertical position that is orientated ninety degrees relative to the horizontal portion. The lever handle 22 defines a handle center axis 60 extending along a length of the lever handle 22. The horizontal position is defined by a horizontal plane H and the vertical position is defined by a vertical plane V orientated at ninety degrees relative to the horizontal plane H. When properly adjusted, the handle center axis 60 does not vary from the horizontal plane H or vertical plane V by more than 2.25° as indicated at 40.

FIG. 2A shows an interface cross-section between the control stem 26, adapter 30, and the lever handle 22. As shown in FIG. 2B (cross-hatching removed for purposes of clarity) without rotating the adapter 30 for adjustment, the worst case alignment is indicated at 42 as 11.25°.

Figure 3:
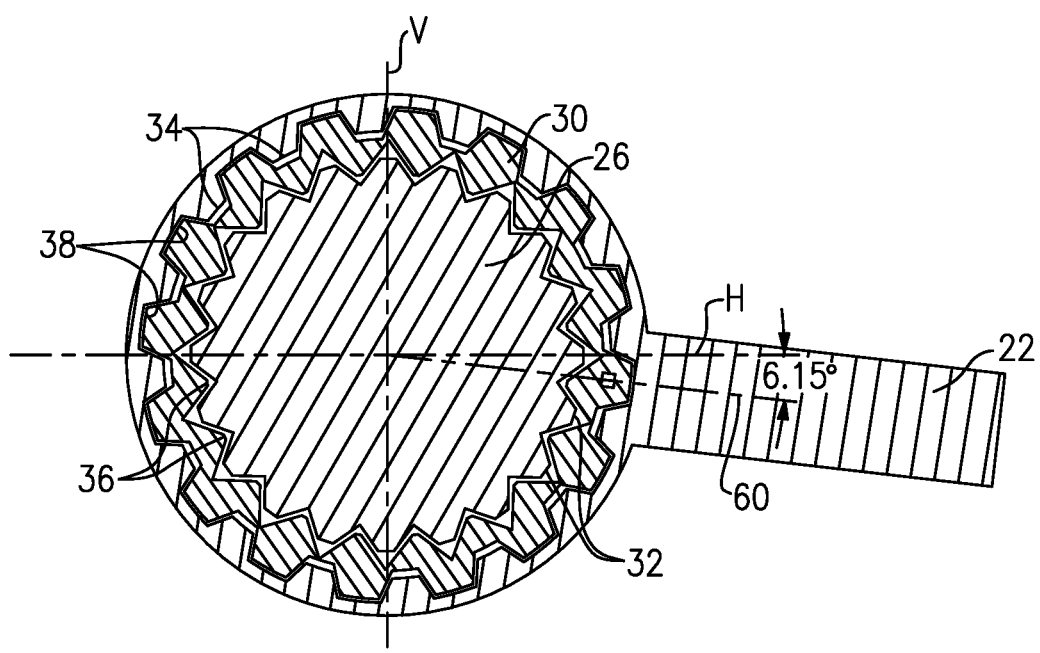
FIG. 3 is a view similar to FIG. 2B but shows one example of adjustment.
Figure 4:
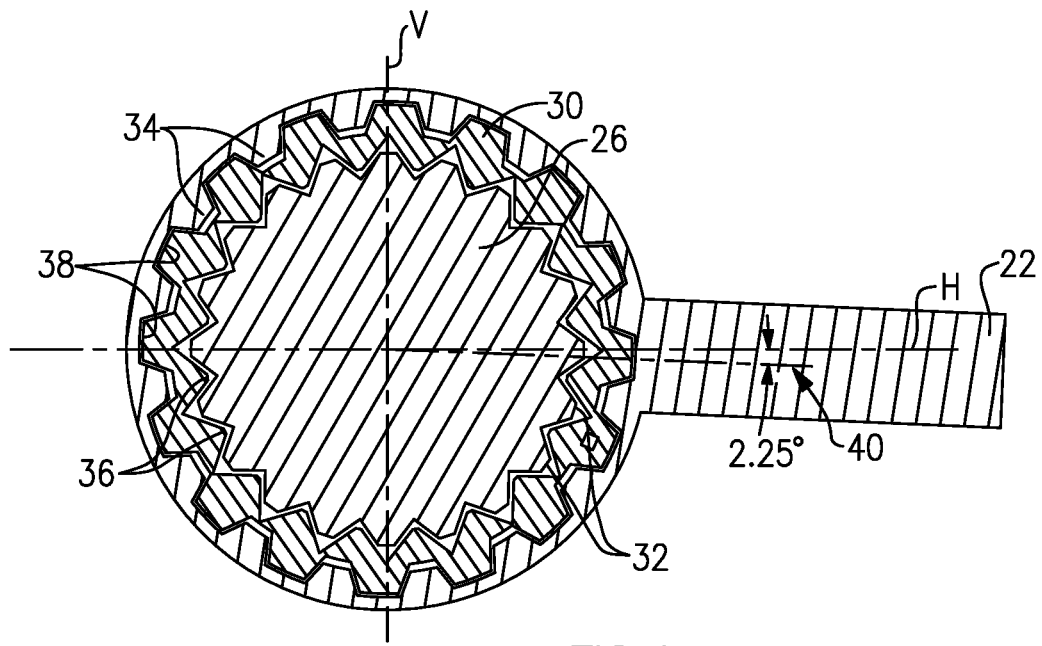
FIG. 4 is a view similar to FIG. 2B but shows another example of adjustment.
Figure 5:
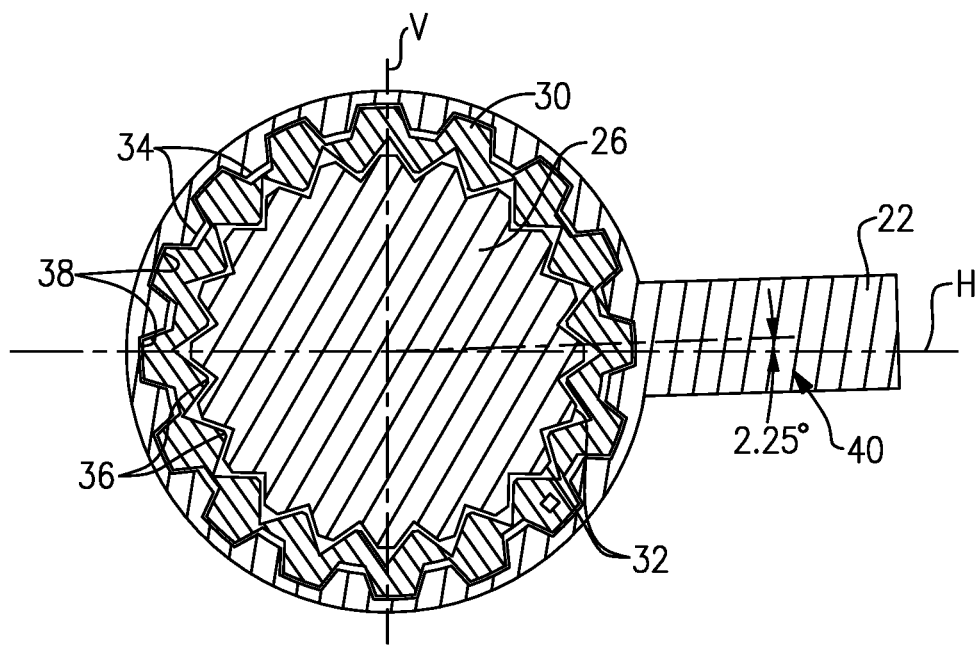
FIG. 5 is a view similar to FIG. 2B but shows another example of adjustment.

FIG. 3 shows that the lever handle misalignment improves to only 6.75° by rotating the adapter 30 by one tooth. FIG. 4 shows that the lever handle misalignment further improves by simply rotating the adapter 30 by two teeth to achieve the maximum allowable misalignment of 2.25° as indicated at 40. As shown in FIG. 5, the lever handle misalignment is also 2.25° when the adapter 30 is rotated by three teeth. In FIG. 4, the misalignment is slightly below the horizontal plane H, while in FIG. 5 the misalignment is slightly above the horizontal plane H.

Figure 6:
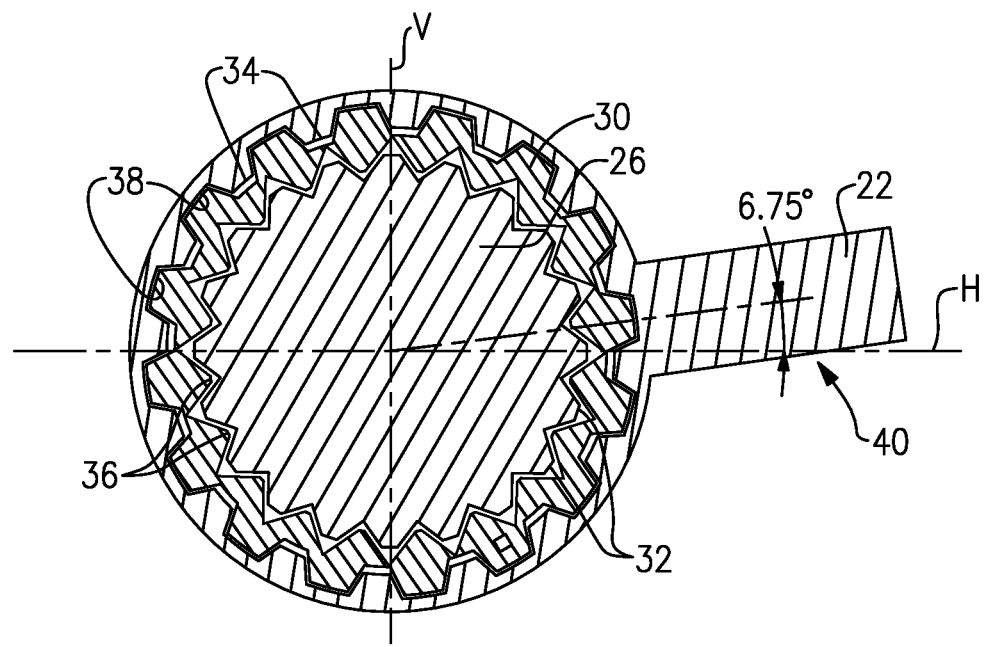
FIG. 6 is a view similar to FIG. 2B but shows another example of adjustment.
Figure 7:
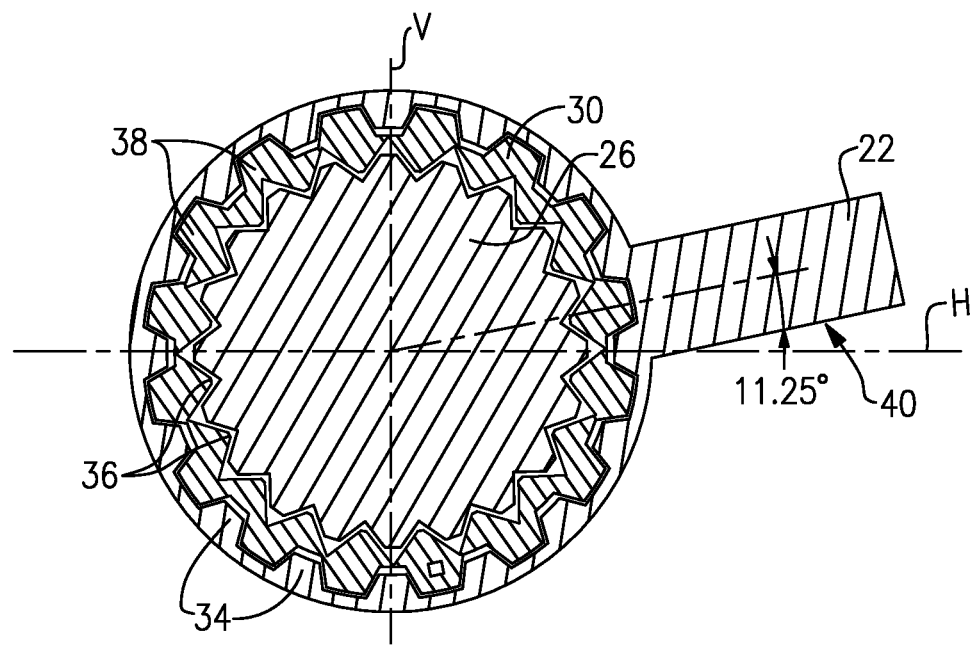
FIG. 7 is a view similar to FIG. 2B but shows another example of adjustment.
Figure 8:
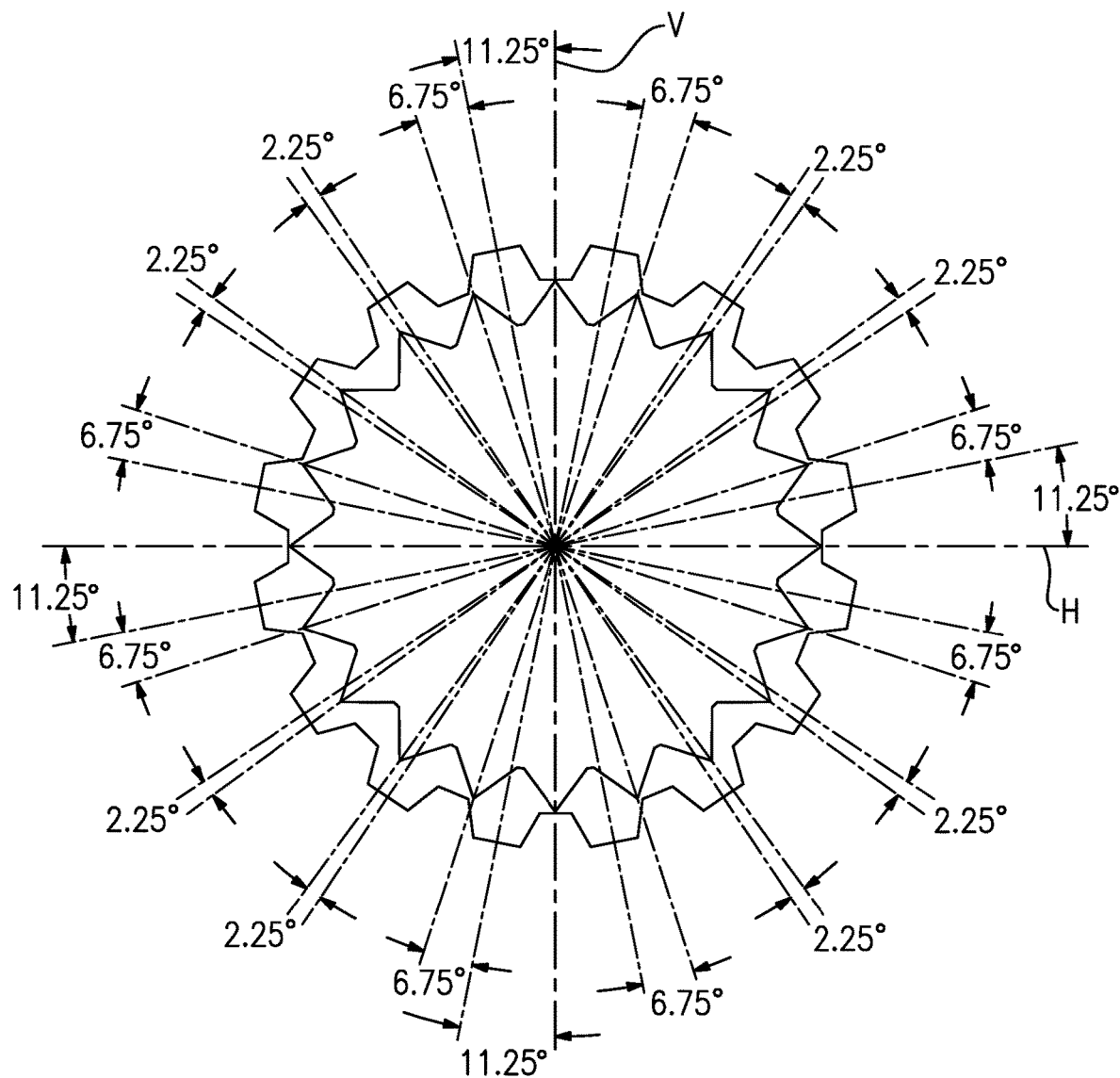
FIG. 8 is a view similar to FIG. 2B but shows a summary of adjustment positions as the adapter rotates 360° about the control stem.

FIG. 6 shows that the lever handle misalignment increases to 6.75° when the adapter is rotated by four teeth and FIG. 7 shows that the lever handle misalignment increases to 11.25° when the adapter is rotated by five teeth. The next rotation would result in an increment of 6.75° and the pattern would repeat during a complete rotation as shown in FIG. 8. FIG. 8 shows a summary of all different misalignment scenarios of the lever handle 22 as the adapter 30 rotates 360° about the control stem 26. Each increment of rotation, i.e. one tooth rotation, comprises a 4.50° difference.

Figure 9:
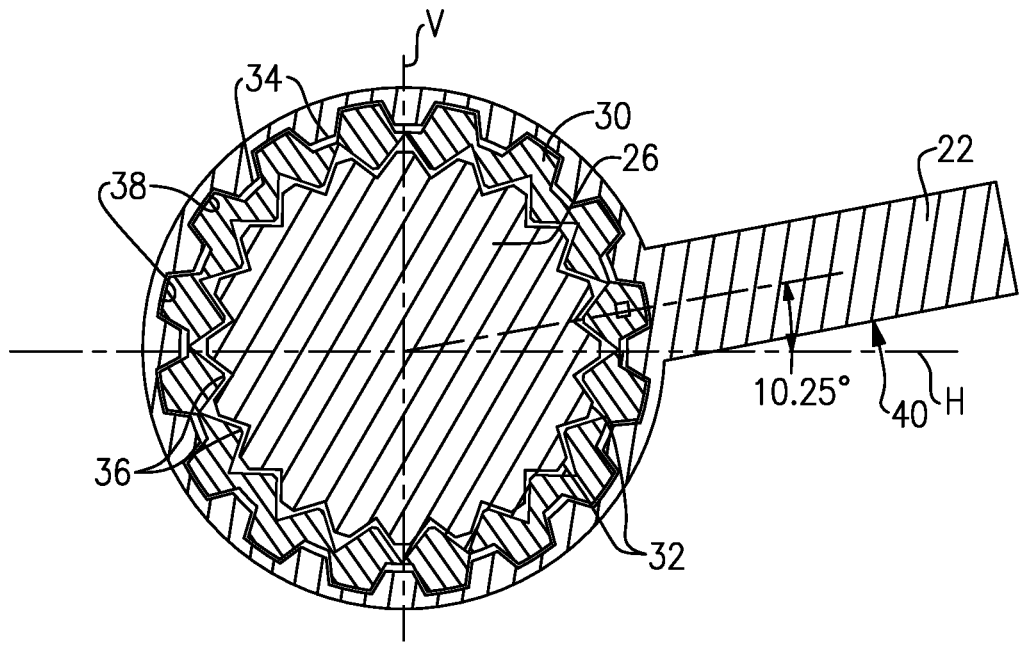
FIG. 9 is a view similar to FIG. 2B but shows another example of adjustment.
Figure 10:
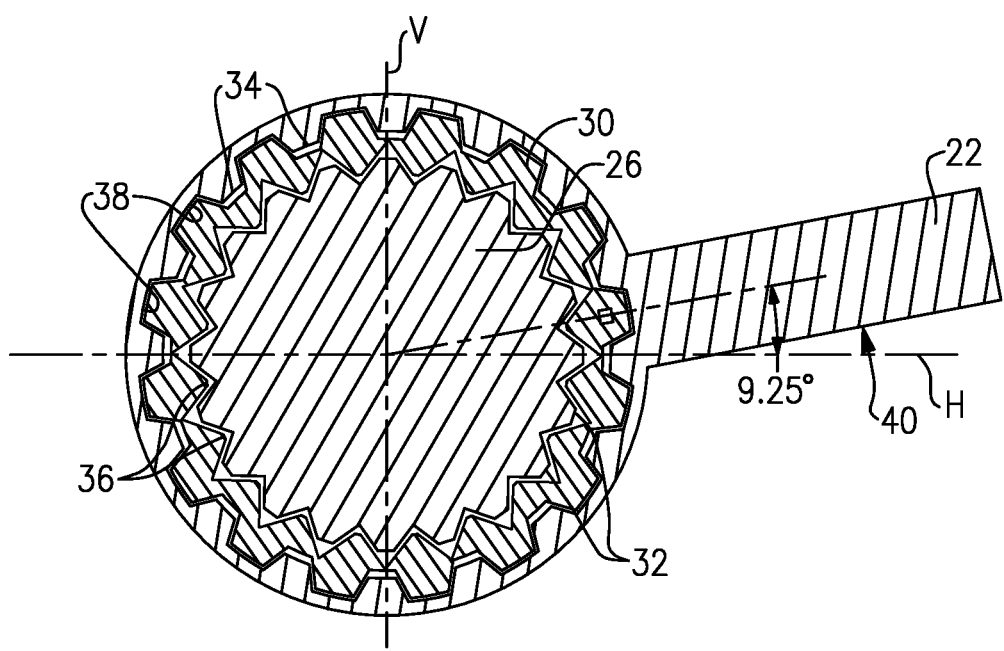
FIG. 10 is a view similar to FIG. 2B but shows another example of adjustment.
Figure 11:
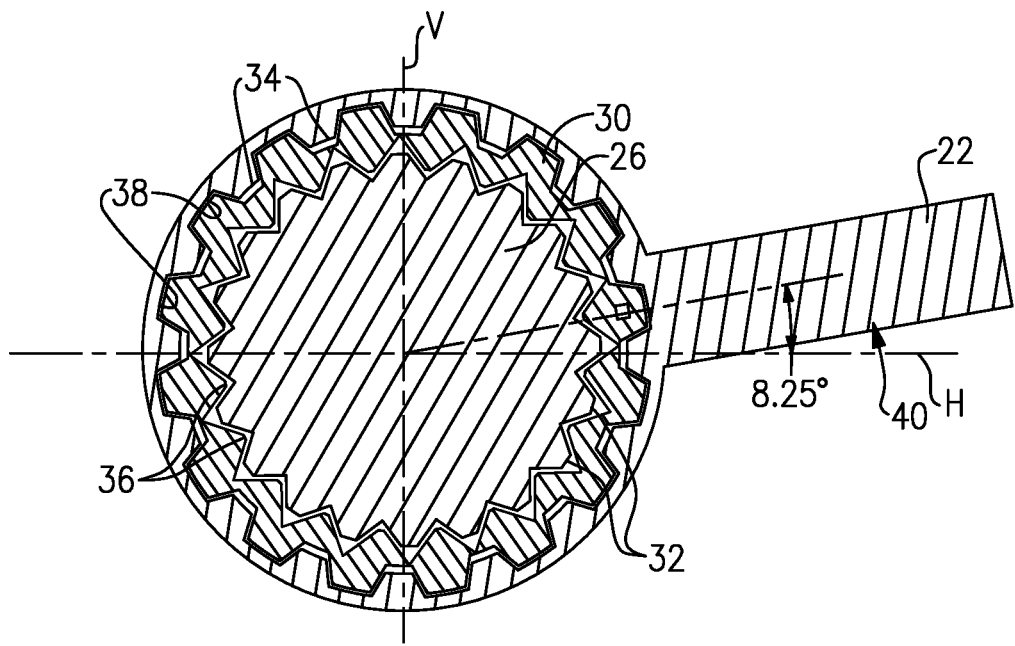
FIG. 11 is a view similar to FIG. 2B but shows another example of adjustment.
Figure 12:
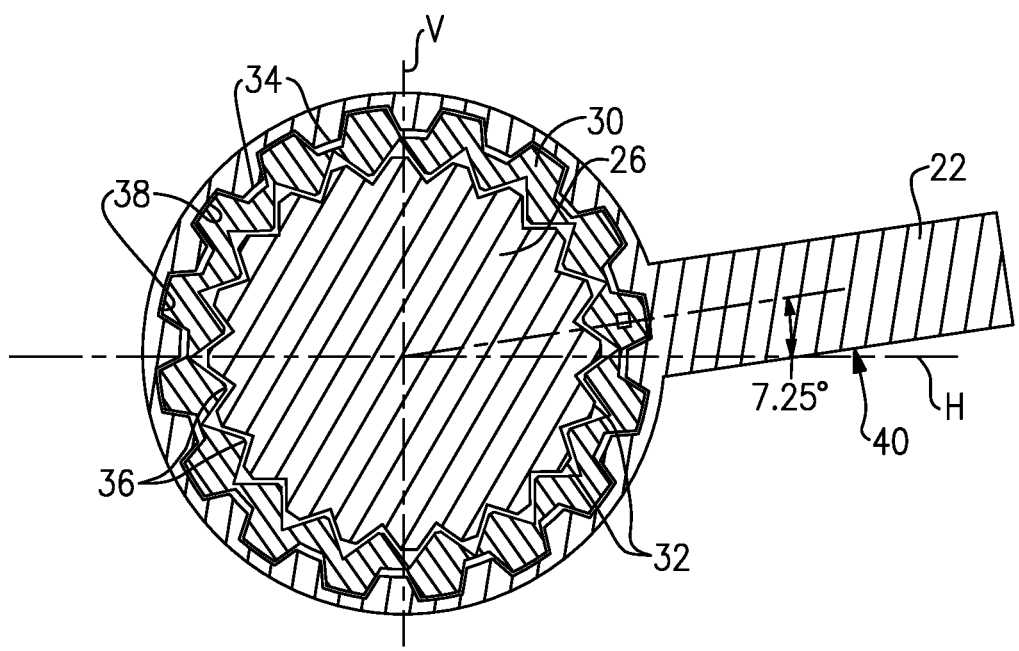
FIG. 12 is a view similar to FIG. 2B but shows another example of adjustment.

FIG. 9 shows an example where an initial misalignment is 10.25°. The adapter 30 can be rotated to minimize this misalignment by reducing it to 1.75°. FIG. 10 shows an example where an initial misalignment is 9.25°. The adapter 30 can be rotated to minimize this misalignment by reducing it to 0.25°. FIG. 11 shows an example where an initial misalignment is 8.25°. The adapter 30 can be rotated to minimize this misalignment by reducing it to 0.75°. FIG. 12 shows an example where an initial misalignment is 7.25°. The adapter 30 can be rotated to minimize this misalignment by reducing it to 1.75°. All of these examples would require rotating the adapter 30 by two teeth.

Figure 13:
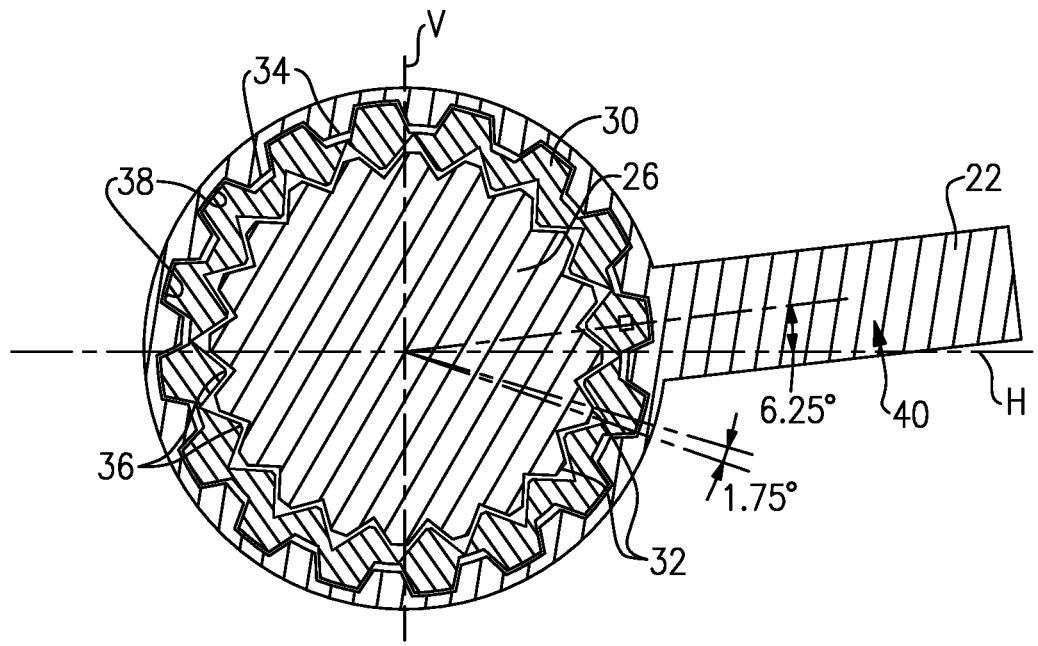
FIG. 13 is a view similar to FIG. 2B but shows another example of adjustment.
Figure 14:
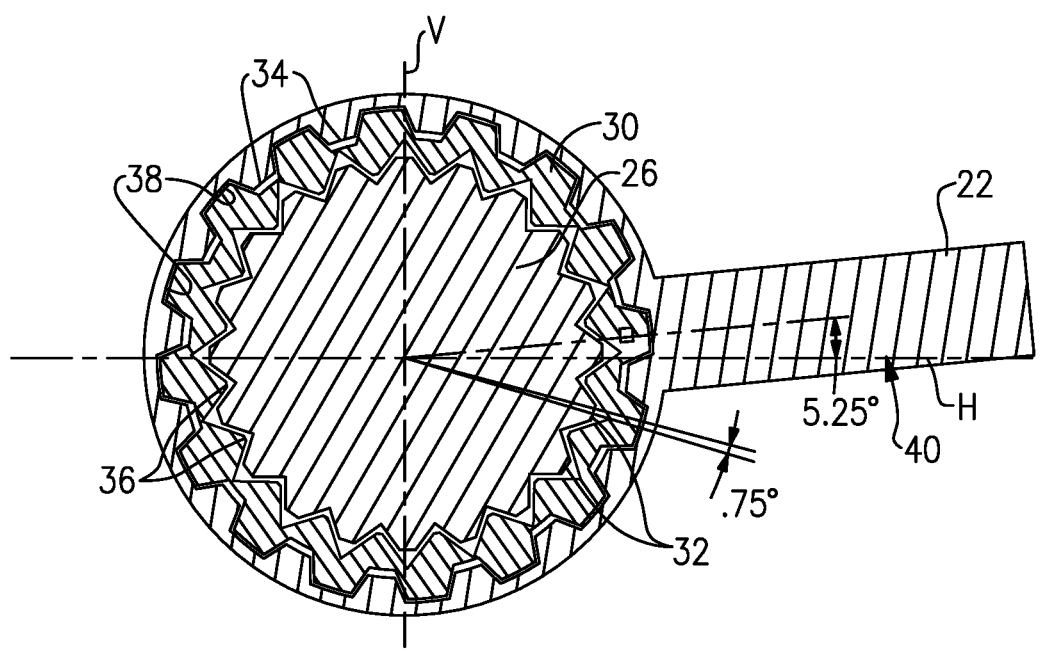
FIG. 14 is a view similar to FIG. 2B but shows another example of adjustment.
Figure 15:
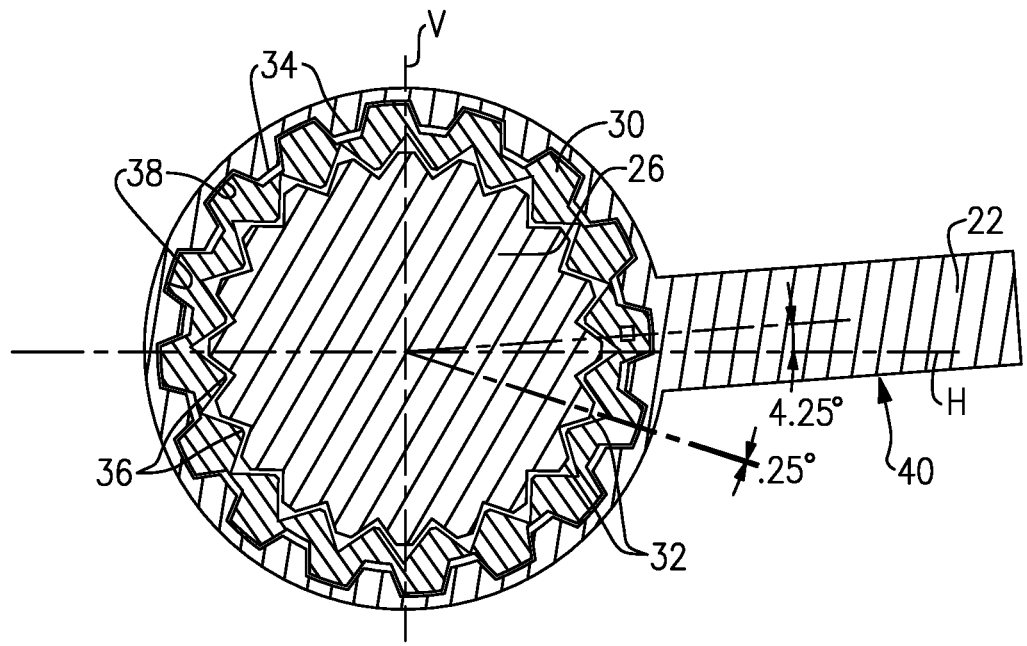
FIG. 15 is a view similar to FIG. 2B but shows another example of adjustment.
Figure 16:
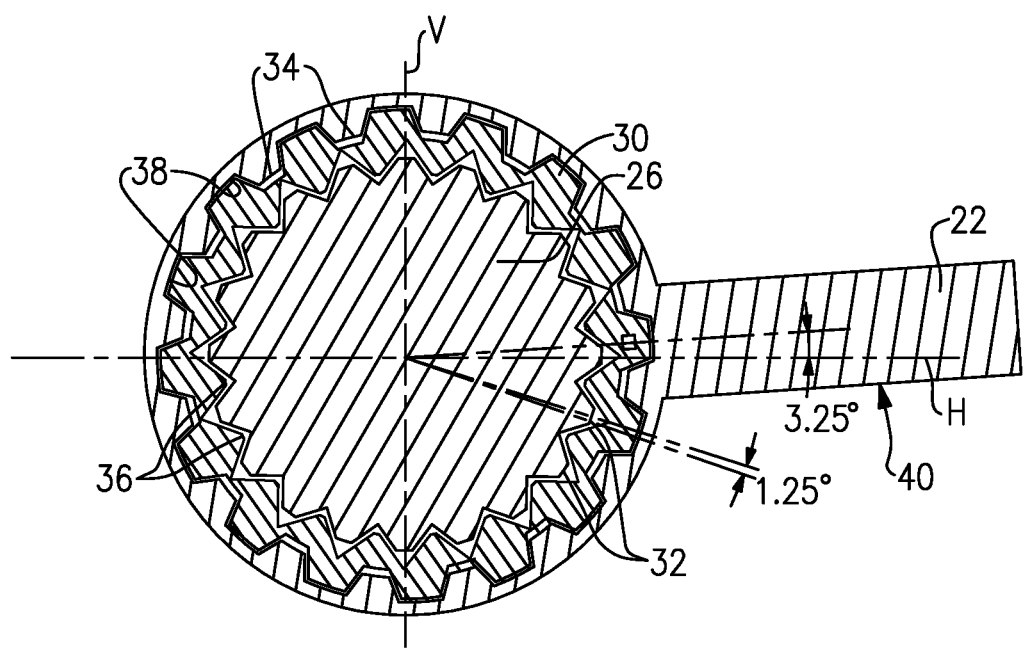
FIG. 16 is a view similar to FIG. 2B but shows another example of adjustment.

FIG. 13 shows an example where an initial misalignment is 6.25°. The adapter 30 can be rotated to minimize this misalignment by reducing it to 1.25°. FIG. 14 shows an example where an initial misalignment is 5.25°. The adapter 30 can be rotated to minimize this misalignment by reducing it to 0.75°. FIG. 15 shows an example where an initial misalignment is 4.25°. The adapter 30 can be rotated to minimize this misalignment by reducing it to 0.25°. FIG. 16 shows an example where an initial misalignment is 3.25°. The adapter 30 can be rotated to minimize this misalignment by reducing it to 1.25°. All of these examples would require rotating the adapter 30 by one tooth.

Figure 17:
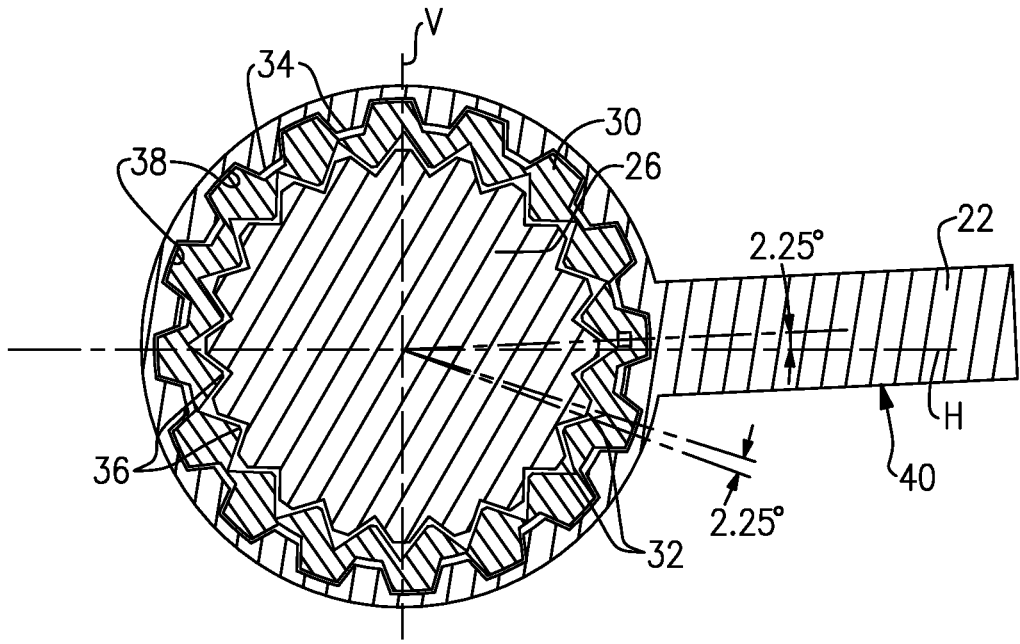
FIG. 17 is a view similar to FIG. 2B but shows another example of adjustment.

FIG. 17 shows an example where an initial misalignment is 2.25°. Rotation of the adapter 30 by one tooth would result in an alignment that would still be 2.25°. However, this alignment would be in the opposite direction. In other words, the first misalignment would be above the horizontal plane H and rotation would result in a second misalignment that would be below the horizontal plane H.

Figure 18:
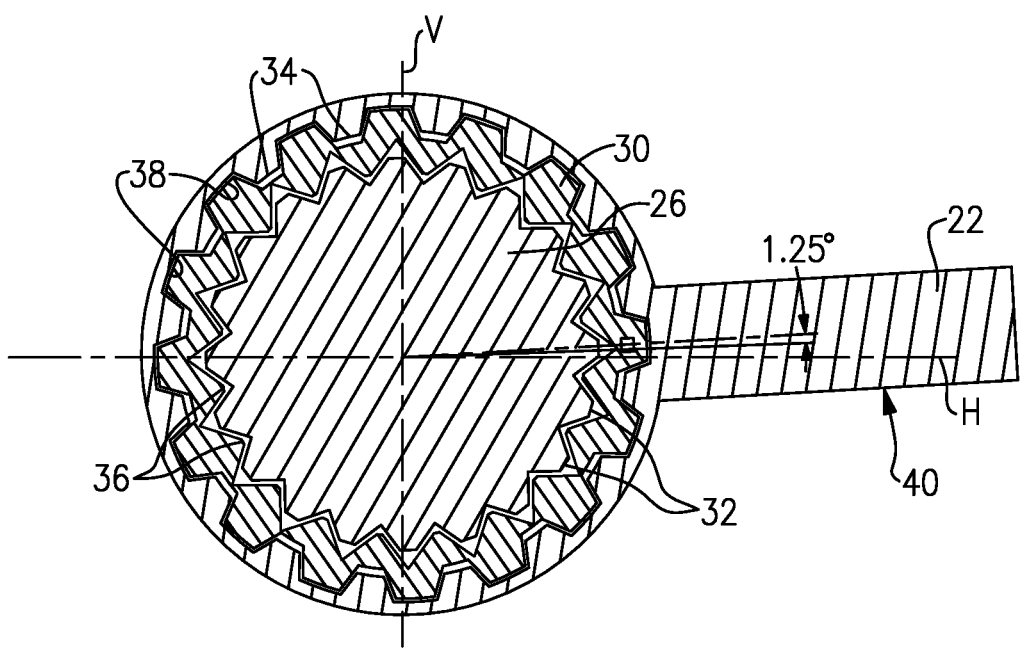
FIG. 18 is a view similar to FIG. 2B but shows another example of adjustment.

FIG. 18 shows an example where the misalignment is 1.25°. There would be no need to rotate the adapter 30 because even rotating it by one tooth would result in an increase in misalignment.

Figure 19:
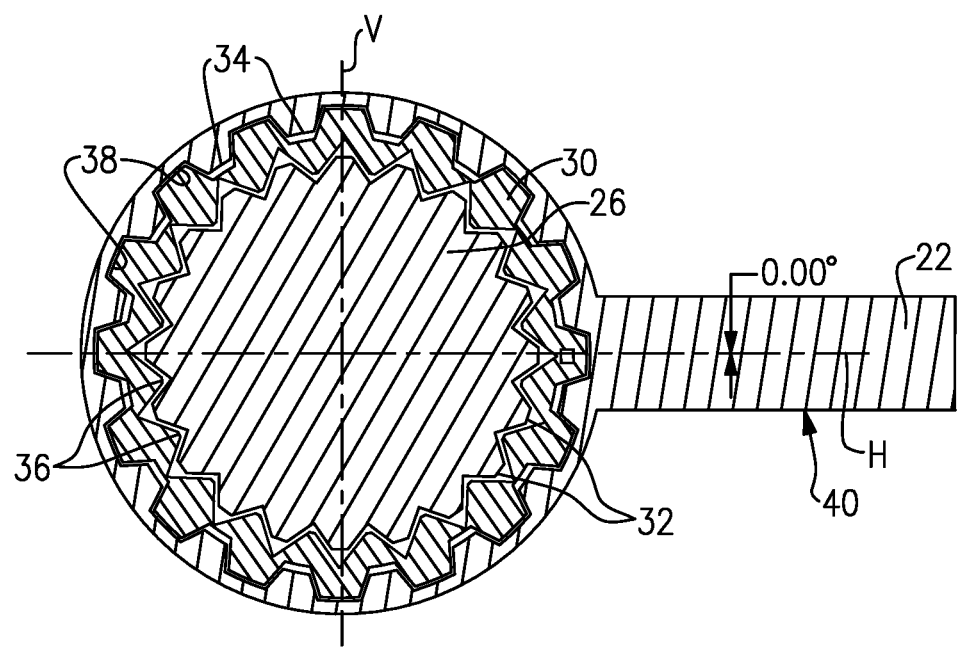
FIG. 19 is a view similar to FIG. 2B but shows another example of adjustment.

FIG. 19 shows an example where there is no initial misalignment, and thus there would be no need to rotate the adapter.

Figure 20:
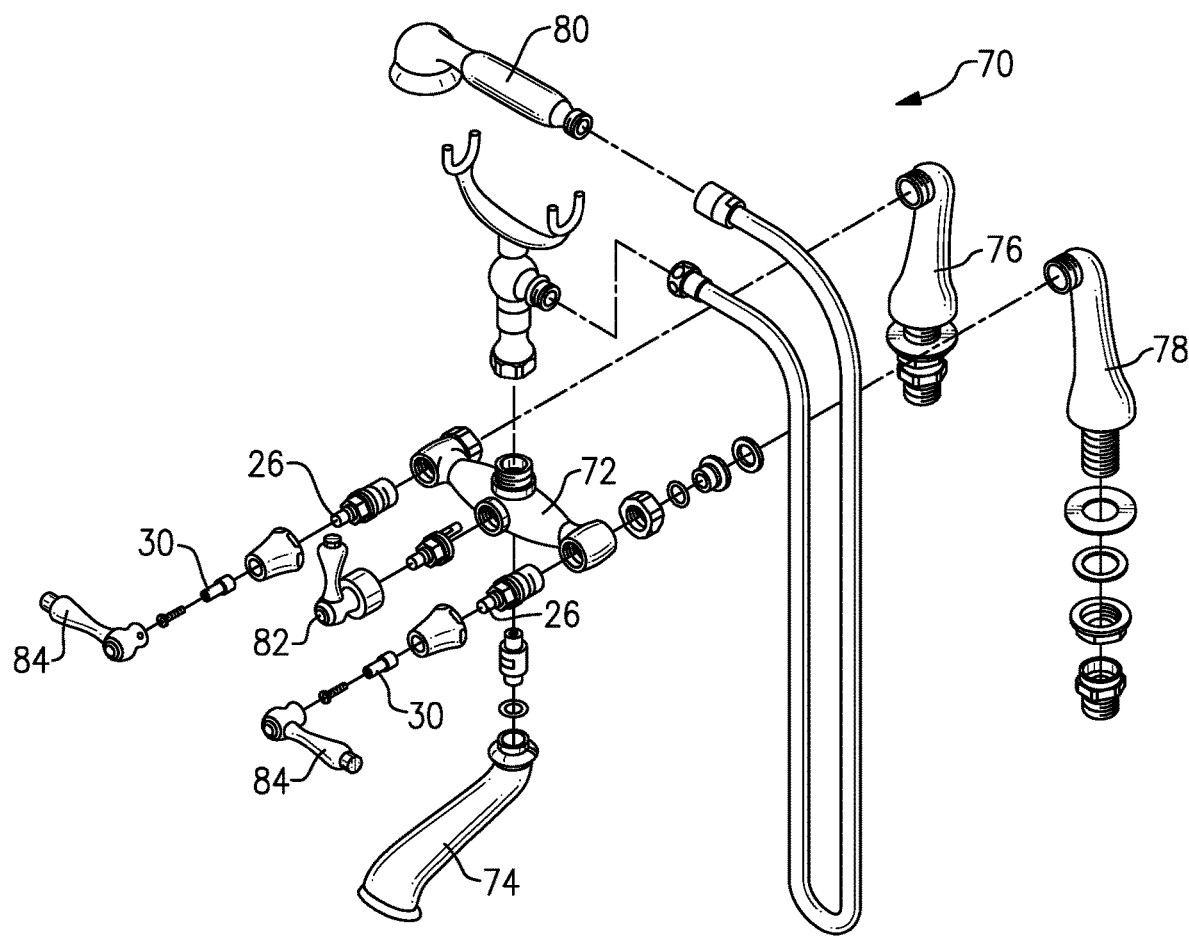
FIG. 20 is a perspective view of a tub filler fixture assembly including the adapter.

FIG. 20 is a perspective view of a tub filler fixture assembly 70 including the adapter 30. A base 72 includes connections for a spout 74, a hot water faucet 76, a cold water faucet 78, a spray handle 80, and a control lever 82 to switch flow between the spout 74 and spray handle 80. The hot and cold water faucets 76, 78 each include a handle 84 and control stem 26. The control stem 26 is associated with the adapter 30 as described above such that the handles 84 can be aligned to a desired off position.

Figure 21:
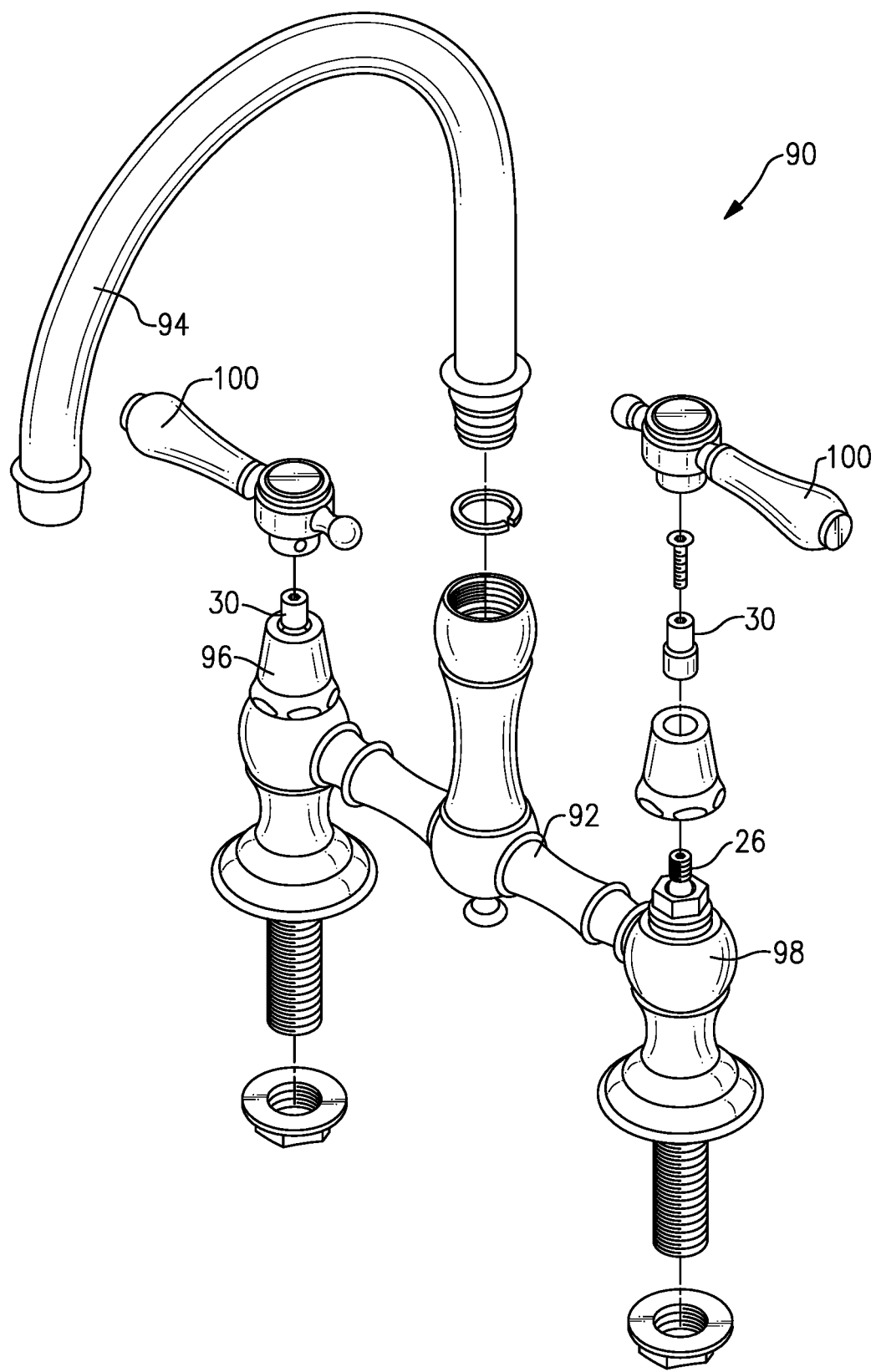
FIG. 21 is a perspective view of a bridge faucet fixture assembly including the adapter.

FIG. 21 is a perspective view of a bridge faucet fixture assembly 90 including the adapter 30. A base 92 includes connections for a spout 94, a hot water faucet 96, and a cold water faucet 98. The hot and cold water faucets 96, 98 each include a handle 100 having a control stem 26. The control stem 26 is associated with the adapter 30 as described above such that the handles 100 can be aligned to a desired off position.

The subject invention utilizes the adapter 30 to reduce possible mis-alignment from a worst case scenario of 11.25° if no adapter was used to a maximum of 2.25° if the adapter is used properly. By simply rotating the adapter 30 relative to the control stem and lever handle, an installer can change the initial misalignment of 11.25° to 2.25°. The improved 2.25° misalignment is the worst case scenario which would require the valve control stem broach, lever handle broach, and the adapter to all be at a certain angular configuration relative to other as a result of worst case tolerance stack-ups. Because all of these components are machined randomly, this maximum misalignment of 2.25° would rarely occur. In most cases, the misalignment would be between 0.0° and 1.75°.

One rotation of the twenty tooth broach equals 18° rotation (360°/20 teeth). Similarly, one rotation of the sixteen tooth broach equals 22.5° (360°/16 teeth). To simplify the analysis, is assumed that a tooth of the control stem 26 is perfectly aligned with the perfect horizontal plane H. As shown in FIG. 2B, a tooth 38 of the adapter 30 is a half tooth 11.25° (22.5°/2) away from the horizontal plane H. The lever handle 22 is also shown as being 11.25° from the perfect horizontal plane H. Because the control stem 26 is firmly fixed to the fixed rough valve 12, it cannot be adjusted to help the lever handle become aligned properly. However, the adapter 30 is free to rotate one tooth at a time relative to the fixed control stem 26 to allow the lever handle 22 to be aligned to the desired horizontal or vertical position. When using two different broaches that include a different number of teeth as described, if the inner broach rotates at a certain angular speed, the outer broach will rotate at a slightly different speed. The subject invention utilizes this phenomena to create a way to align the lever a handle to a desired position.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The invention claimed is:

1. A handle assembly for a plumbing fixture comprising:
a control valve having a rough plumbing attachment interface, the control valve including a control stem having a first number of teeth;
a lever handle with a second number of teeth that is a different number than the first number of teeth, the lever handle configured for attachment to the control valve via an adapter;
the adapter having an adapter body with a set of adapter internal teeth directly engaging the control stem and a set of adapter external teeth directly engaging the lever handle such that the adapter directly couples the control stem to the lever handle without any intervening components, and wherein the set of adapter external teeth surround the set of adapter internal teeth, and wherein the set of adapter internal teeth correspond in number to the first number of teeth and the set of adapter external teeth correspond in number to the second number of teeth; and
wherein a desired final installation position is a horizontal or vertical position, and wherein the lever handle defines a handle center axis extending along a length of the lever handle, and wherein the horizontal position is defined by a horizontal plane and the vertical position is defined by a vertical plane orientated at ninety degrees relative to the horizontal plane, and wherein when properly adjusted the handle center axis varies from the horizontal plane or vertical plane by no more than an angle as defined by the following equation: Maximum Angle of Misalignment=2×[(360 degrees÷"Adapter Internal Teeth")÷"Adapter External Teeth"], and wherein the maximum angle of misalignment of the handle center axis to the horizontal or vertical position is 2.25°.

2. The handle assembly according to claim 1 wherein the set of adapter internal teeth have a first shape and the set of adapter external teeth have a second shape that is different than the first shape.

3. The handle assembly according to claim 2 wherein the first number of teeth is greater than the second number of teeth and that when dividing the larger number of teeth by the smaller number of teeth the result is not a whole number (integer).

4. The handle assembly according to claim 2 wherein the first number of teeth are formed on an external surface of the control stem to directly mesh with the set of adapter internal teeth and the second number of teeth are formed on an internal surface of the lever handle to directly mesh with the set of adapter external teeth, and wherein the first shape comprises a triangular shape in section and the second shape comprises a frusto-conical shape in section.

5. The handle assembly according to claim 4 wherein the set of adapter internal teeth are formed on an internal surface of the adapter and the set of adapter external teeth are formed on an external surface of the adapter such that the set of adapter external teeth are located radially outwardly of the set of adapter internal teeth in an overlapping radial direction relationship, and wherein the set of adapter external teeth have a frusto-conical shape in section and the second number of teeth have a frusto-conical shape in section.

6. The handle assembly according to claim 5 wherein the first number of teeth is greater than the second number of teeth, and wherein when dividing the first number of teeth by the second number of teeth the result is not a whole number (integer).

7. The handle assembly according to claim 1 wherein the adapter is rotated relative to the control stem to adjust an installation position of the lever handle relative to a horizontal position or a vertical position that is orientated ninety degrees relative to the horizontal position.

8. The handle assembly according to claim 1 wherein the control stem comprises a cartridge having the first number of teeth, and wherein the lever handle includes an internal broach having the second number of teeth, and wherein the first number of teeth and the second number of teeth have a frusto-conical shape in section.

9. The handle assembly according to claim 8 wherein the set of adapter internal teeth have a triangular shape in section and the set of adapter external teeth have a frusto-conical shape in section.

10. The handle assembly according to claim 1 wherein the lever handle rotates about a handle rotational axis and comprises an elongated member having a handle center axis extending along a length of the lever handle that intersects the handle rotational axis, and wherein the second number of teeth are formed on an internal surface of an opening in the elongated member, and wherein the adapter comprises a single component that directly couples the second number of teeth of the lever handle to the first number of teeth of the control stem without any intervening components.

11. The handle assembly according to claim 1 wherein the adapter is rotatable to allow an angle of the lever handle to be adjusted in increments to align the handle center axis with the desired final installation position, and wherein each increment of rotation comprises one tooth rotation of the adapter.

12. The handle assembly according to claim 1 wherein the rough plumbing attachment interface is configured to connect to a rough valve such that the control valve and rough valve cooperate with each other to control fluid flow in a fixture to direct flow into a sink, tub, and/or shower, and wherein, when the control stem is firmly fixed to the rough valve, the adapter is configured to be rotated one tooth at a time relative to the control stem to allow the lever handle to be aligned to the desired final installation position.

13. The handle assembly according to claim 1 wherein the set of adapter internal teeth are formed on an internal surface of the adapter and the set of adapter external teeth are formed on an external surface of the adapter such that the set of adapter external teeth are located radially outwardly of the set of adapter internal teeth in an overlapping radial direction relationship.

14. The handle assembly according to claim 13 wherein the control stem includes a set of stem teeth that correspond to the first number of teeth, and wherein the lever handle includes a set of handle teeth that correspond to the second number of teeth, and wherein the set of handle teeth are located radially outwardly of the set of stem teeth in an overlapping radial direction relationship.

15. An adjustment kit for a plumbing fixture comprising:
an adapter configured to directly connect a fluid control valve to a lever handle, the adapter having an adapter body with an internal surface with a set of adapter internal teeth comprising a first number of teeth that directly engage a control stem of the fluid control valve, and the adapter body having an external surface with a set of adapter external teeth comprising a second number of teeth that directly engage the lever handle, wherein the second number of teeth is a different number than the first number of teeth, and wherein the adapter is configured to directly connect the control stem to the lever handle without any intervening components, and wherein the set of adapter external teeth surround the set of adapter internal teeth, and wherein the adapter is rotatable relative to the control stem of the fluid control valve to bring the lever handle in alignment with a horizontal or vertical position with a maximum angle defined as: Maximum Angle of Misalignment=2×[(360 degrees÷"Adapter Internal Teeth")÷"Adapter External Teeth"]; and
wherein a desired final installation position is the horizontal or vertical position, and wherein the lever handle defines a handle center axis extending along a length of the lever handle, and wherein the horizontal position is defined by a horizontal plane and the vertical position is defined by a vertical plane orientated at ninety degrees relative to the horizontal plane, and wherein when properly adjusted the handle center axis varies from the horizontal plane or vertical plane by no more than an angle as defined by the following equation: Maximum Angle of Misalignment=2×[(360 degrees÷"Adapter Internal Teeth")÷"Adapter External Teeth"], and wherein the maximum angle of misalignment of the handle center axis to the horizontal or vertical position is 2.25°.

16. The adjustment kit according to claim 15 wherein the first number of teeth is greater than the second number of teeth.

17. The adjustment kit according to claim 16 wherein when dividing the first number of teeth by the second number of teeth the result is not a whole number (integer).

18. The adjustment kit according to claim 15 wherein the fluid control valve includes an attachment interface configured to attach to a rough plumbing structure.

19. The adjustment kit according to claim 15 wherein the control stem comprises a cartridge having a set of stem teeth corresponding in number to the first number of teeth, and wherein the lever handle includes an internal broach having a set of handle teeth corresponding in number to the second number of teeth, and wherein the set of adapter internal teeth have a first shape and the set of adapter external teeth have a second shape that is different than the first shape.

20. The adjustment kit according to claim 19 wherein the first shape comprises a triangular shape in section and the second shape comprises a frusto-conical shape in section.

21. The adjustment kit according to claim 15 wherein the lever handle rotates about a handle rotational axis and comprises an elongated member having a handle center axis extending along a length of the lever handle that intersects the handle rotational axis, and wherein a set of handle teeth are formed on an internal surface of an opening in the elongated member, and wherein the adapter comprises a single component that directly couples the set of handle teeth of the lever handle to a set of stem teeth of the control stem without any intervening components, and wherein the set of adapter external teeth are located radially outwardly of the set of adapter internal teeth in an overlapping radial direction relationship.

22. The adjustment kit according to claim 21 wherein the set of handle teeth are located radially outwardly of the set of stem teeth in an overlapping radial direction relationship.

23. The adjustment kit according to claim 15 wherein the adapter is rotatable to allow an angle of the lever handle to be adjusted in increments to align the handle center axis with the horizontal or vertical position, and wherein each increment of rotation comprises one tooth rotation of the adapter.

24. The adjustment kit according to claim 15 wherein the fluid control valve includes a rough plumbing attachment interface configured to connect to a rough valve such that the fluid control valve and rough valve cooperate with each other to control fluid flow in a fixture to direct flow into a sink, tub, and/or shower, and wherein, when the control stem is firmly fixed to the rough valve, the adapter is configured to be rotated one tooth at a time relative to the control stem to allow the lever handle to be aligned with the horizontal or vertical position.

25. An adapter for a plumbing fixture comprising:
an adapter body configured to directly connect a fluid control valve to a lever handle, the adapter body having an internal surface with a set of inner teeth comprising a first number of teeth that directly engage a control stem of the fluid control valve, and the adapter body having an external surface with a set of outer teeth that surround the set of inner teeth, the set of outer teeth comprising a second number of teeth that directly engage the lever handle, wherein the second number of teeth is a different number than the first number of teeth, and wherein the adapter is configured to directly connect the control stem to the lever handle without any intervening components; and
wherein a desired final installation position is a horizontal or vertical position, and wherein the lever handle defines a handle center axis extending along a length of the lever handle, and wherein the horizontal position is defined by a horizontal plane and the vertical position is defined by a vertical plane orientated at ninety degrees relative to the horizontal plane, and wherein when properly adjusted the handle center axis varies from the horizontal plane or vertical plane by no more than an angle as defined by the following equation: Maximum Angle of Misalignment=2×[(360 degrees÷"Adapter Internal Teeth")÷"Adapter External Teeth"], and wherein the maximum angle of misalignment of the handle center axis to the horizontal or vertical position is 2.25°.

26. The adapter according to claim 25 wherein the control stem comprises a cartridge spline having a set of stem teeth corresponding in number to the first number of teeth, and wherein the lever handle includes an internal broach having a set of handle teeth corresponding in number to the second number of teeth, and wherein the set of inner teeth have a first shape and the set of outer teeth have a second shape that is different than the first shape.

27. The adapter according to claim 26 wherein the first shape comprises a triangular shape in section and the second shape comprises a frusto-conical shape in section.

28. The adapter according to claim 27 wherein the set of stem teeth and the set of handle teeth have a frusto-conical shape in section.

29. The adapter according to claim 25 wherein the lever handle rotates about a handle rotational axis and comprises an elongated member having a handle center axis extending along a length of the lever handle that intersects the handle rotational axis, and wherein a set of handle teeth are formed on an internal surface of an opening in the elongated member, and wherein the adapter body comprises a single component that directly couples the set of handle teeth of the lever handle to a set of stem teeth of the control stem without any intervening components, and wherein the set of outer teeth are located radially outwardly of the set of inner teeth in an overlapping radial direction relationship.

30. The adaptor according to claim 29 wherein the set of handle teeth are located radially outwardly of the set of stem teeth in an overlapping radial direction relationship.

31. The adapter according to claim 25 wherein the adapter is rotatable to allow an angle of the lever handle to be adjusted in increments to align the handle center axis with the desired final installation position, and wherein each increment of rotation comprises one tooth rotation of the adapter.

32. The adapter according to claim 25 wherein the fluid control valve includes a rough plumbing attachment interface configured to connect to a rough valve such that the fluid control valve and rough valve cooperate with each other to control fluid flow in a fixture to direct flow into a sink, tub, and/or shower, and wherein, when the control stem is firmly fixed to the rough valve, the adapter is configured to be rotated one tooth at a time relative to the control stem to allow the lever handle to be aligned to the desired final installation position.

33. The handle assembly according to claim 1 wherein the set of adapter internal teeth comprise a row of internal teeth that are circumferentially spaced apart from each other about an inner surface of the adapter, and wherein the number of first teeth equals the number of internal teeth, and wherein the set of adapter external teeth comprise a row of external teeth that are circumferentially spaced apart from each other about an outer surface of the adapter, and wherein the number of second teeth equals the number of external teeth.

34. The handle assembly according to claim 1 wherein the control stem is firmly fixed to a fixed rough valve via the rough plumbing attachment interface, and wherein the adapter is selectively rotated one tooth at a time relative to the control stem that is fixed to the fixed rough valve to adjust an installation position of the lever handle relative to the horizontal position or the vertical position that is orientated ninety degrees relative to the horizontal position.

* * * * *